United States Patent [19]

Kita

[11] Patent Number: 4,867,042
[45] Date of Patent: Sep. 19, 1989

[54] CASING AND COVER FOR FLUID ENERGY CONVERTER

[76] Inventor: Yasuo Kita, 62-39, Ohtsuka Motoyashiki-cho Yamashina-ku, Kyoto, 607, Japan

[21] Appl. No.: 327,453

[22] Filed: Mar. 22, 1989

Related U.S. Application Data

[63] Continuation-in-part of Ser. No. 70,500, Jul. 7, 1987, abandoned.

[51] Int. Cl.⁴ .............................................. F01B 13/06
[52] U.S. Cl. .......................................... 92/58; 91/498
[58] Field of Search ...................... 91/497, 498; 92/58, 92/148; 285/390

[56] References Cited

U.S. PATENT DOCUMENTS

| | | | |
|---|---|---|---|
| 2,196,966 | 4/1940 | Hammer | 285/390 |
| 2,379,156 | 6/1945 | Johanson | 91/498 |
| 2,838,003 | 6/1958 | Joy | 91/498 |
| 3,245,322 | 4/1966 | Gransten et al. | 91/498 |
| 3,595,018 | 7/1971 | Saylor, Jr. | 91/498 |
| 4,739,618 | 4/1988 | Kita et al. | 91/497 |

FOREIGN PATENT DOCUMENTS 55372 3/1986 Japan ..................... 91/497

Primary Examiner—William L. Freeh
Attorney, Agent, or Firm—Armstrong, Nikaido, Marmelstein, Kubovcik & Murray

[57] ABSTRACT

A fluid energy converter having a cover to support a cylinder barrel positioned and mounted on the casing main body. At the opening end of the casing main body, a helical taper plane at an angle not more than 45° with respect to the axial centerline of the body open end is formed, helically of the casing body. The taper plane faces the open end of the casing main body and a taper plane at the same angle is formed on the cover. The cover is fitted to the casing main body by threading together the taper planes so that the cover is correctly positioned by the taper guide action. Because the angle of taper plane is not more than 45°, the cover and casing main body are not dislocated if a force is applied in a radial direction.

3 Claims, 8 Drawing Sheets

CASING AND COVER FOR FLUID ENERGY CONVERTER

BACKGROUND OF THE INVENTION

This application is a continuation-in-part of application Ser. No. 070,500, filed July 7, 1987, now abandoned, and relates to a fluid energy converter used as a fluid pump or a fluid motor.

In general radial piston type liquid pressure pump/motor, or, as stated below, special liquid pressure pump/motor, a rear cover is fitted to the opening end of the casing, and a cylinder barrel disposed within the casing is supported on the rear cover by way of an eccentric pintle. In such arrangement, due to the effects of working fluid at high pressure, a large misaligning force in the radial direction may occur between the casing main body and rear cover. What is more important, smooth operation is spoiled unless the casing and the rear cover are coupled in a correctly positioned state.

Conventionally, therefore, a spigot has been provided between the casing main body and the rear cover, and a flange coupling part has been disposed at its outer side with the two parts accurately coupled together by a bolt or other fixing means in the flange coupling part.

However, in order to keep a high positioning precision at the spigot, machining of high precision is required. When the precision is too high, it is hard to fit the two parts to each other. Besides, since the flange coupling part must be provided at the outer side of the spigot, the casing outside dimension increases, and is hard to design compactly. In particular, when two sets of such fluid energy transducer are placed side by side, and one is used as the pump and the other as a motor, that is, when composing a unitized HST or HMT system transmission by two fluid energy converters, the entire structure becomes very large due to the bulkiness in the direction of diameter of the both parts.

This invention is therefore intended to solve these problems securely and easily.

BRIEF SUMMARY OF THE INVENTION

This invention, in order to achieve said object, is characterized by the thread-fitting structure and the helical taper plane provided in the coupling part of the casing main body and cover.

That is, the fluid energy transducer of this invention is composed by helically forming a taper plane at an angle of 45° or less with respect to the axial center on the inner circumference or outer circumference of the opening end part of the casing main body, forming a helical taper plane at a same angle as said taper plane on the cover and a stopping plane to stop the opening end of the casing main body, and threading the taper plane forming part of the casing main body up to the position where the opening end is stopped on the stopping plane.

In such construction, by threading the cover having a helical taper plane having a same angle into the outer circumference or inner circumference of the opening end of the casing main body helically forming a taper plane, and tightening until the opening end of the casing main body abuts against the stopping plane, the taper plane of the casing main body rides on the taper plane of the cover in tight contact. As a result, the taper guide action is exhibited, and the cover and casing main body are positioned in specified state. Thus, in this state, the gap between the casing main body and cover in the radial direction is completely eliminated.

Moreover, since these taper planes are slightly inclined at 45° or less with respect to the axial center, the taper plane of the cover will hardly slide along the taper plane of the casing main body if a load is applied in the radial direction. Accordingly, due to the effects of the fluid pressure, if a misaligning force should occur in the radial direction between the casing main body and cover, the two parts will never be dislocated.

Besides, since the taper planes are formed helically the casing main body and cover may be coupled by a simple threading operation. Still more, by fitting the opening end of the casing main body on the stopping plane of the cover, the positioning of the two parts in the axial direction may be accurately achieved.

Therefore, in such construction, without using spigot and flange coupling part, the casing main body and cover can be securely and accurately joined together.

BRIEF DESCRIPTION OF THE DRAWINGS

FIG. 1 to FIG. 5 relate to one embodiment of the invention and FIGS. 7 to 10 relate to a second embodiment of the invention, in which:

FIG. 1 is a longitudinal sectional view of the first embodiment;

FIG. 2 is a sectional view at II—II, FIG. 1;

FIG. 3 is a lateral sectional view;

FIG. 4 is an enlarged sectional view of the threaded connection of FIGS. 1 and 2;

FIG. 5 is a side view of the assembly of the instant invention;

DETAILED DESCRIPTION OF THE INVENTION

Referring now to FIG. 1 to FIG. 5 and FIG. 7 to FIG. 10, preferable embodiments of this invention are described in details below.

Figure 1:
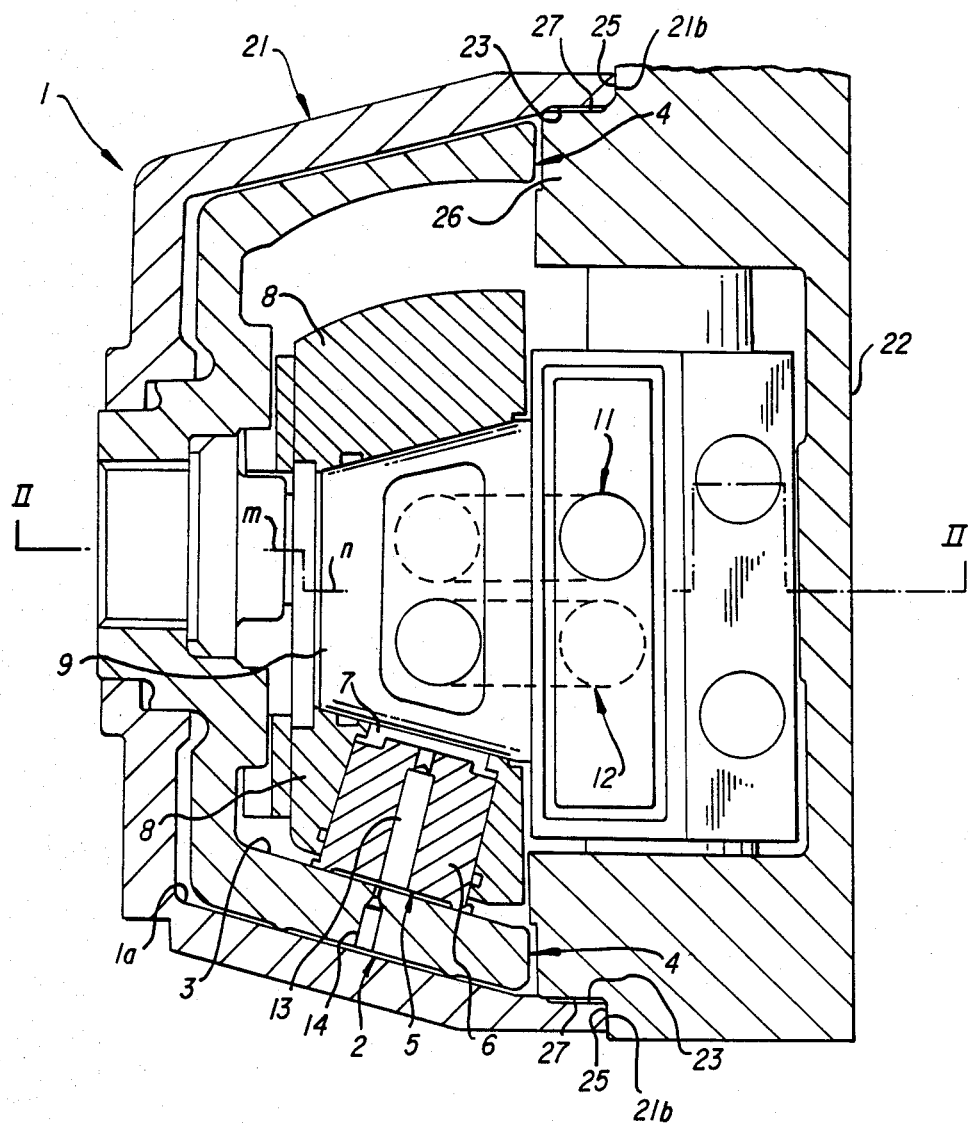
Figure 2:
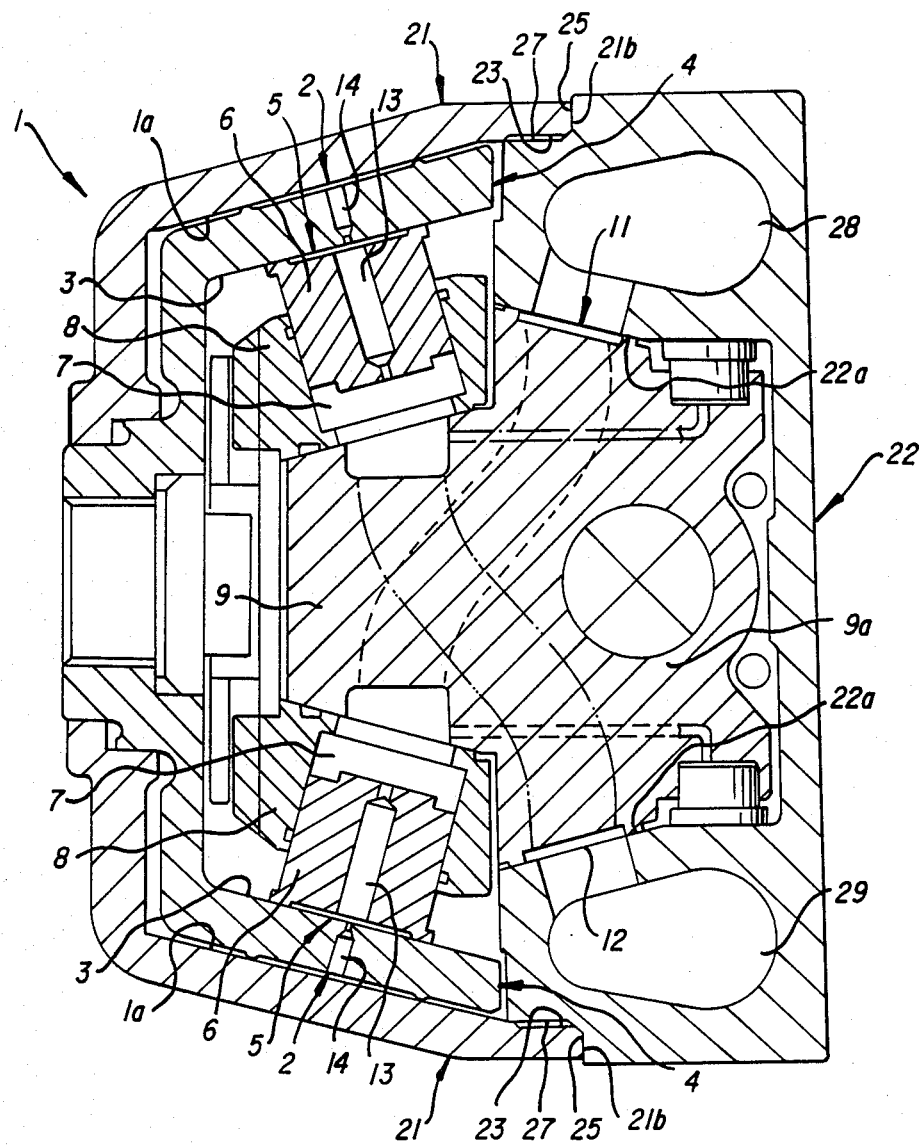
Figure 3:
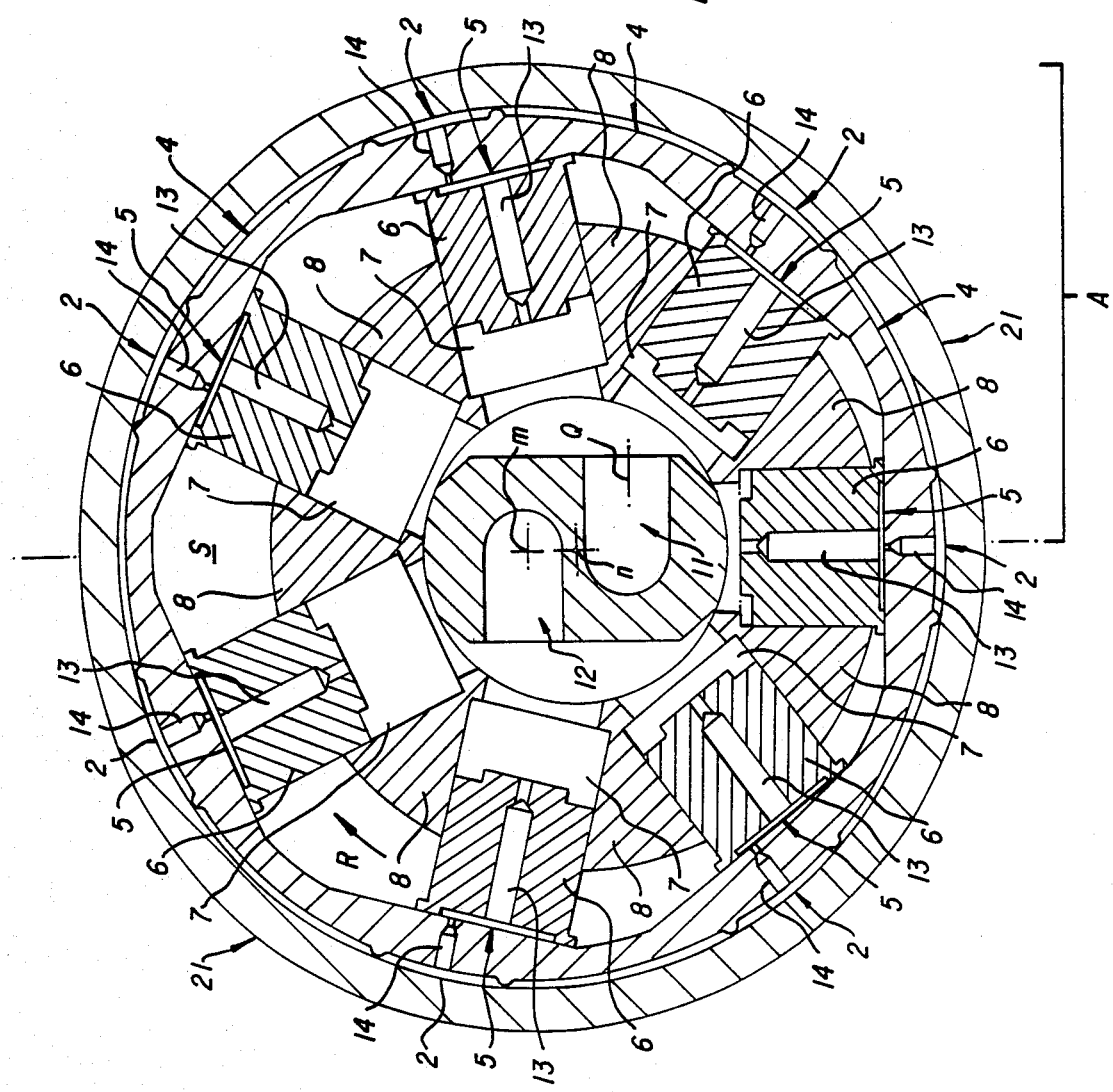

The fluid energy converter shown in FIG. 1 to FIG. 3 has a structure as disclosed in the Japanese Laid-open Patent No. 58-77179. That is, this energy converter is composed of casing 1, a torque ring 4 having inner flat planes 3 respectively at the inside of the positions corresponding to plural first static pressure bearings 2 rotatably fitted relatively through static pressure bearings 2 provided on the inner circumference 1a of casing 1, plural pistons 6 being disposed inside of this torque ring 4 with their ends fitted to the inner flat planes 3 through second static pressure bearings 5, a cylinder barrel 8 holding pistons 6 in a slidable manner and forming a free space 7 for entry and discharge of fluid in pistons 6, a pintle 9 for rotatably supporting cylinder barrel 8 being disposed reciprocatably in the direction orthogonal to the axial center m of casing 1 and torque ring 4, and fluid passages 11, 12 forming a pair to communicate with the space 7 of which volume is increased and with the space 7 of which volume is decreased when the casing 1 and torque ring 4 are relatively rotated with the axial center n of pintle 9 deviated from the axial center m of the casing. In this setup, the fluid to fill up the spaces 7 is led into corresponding first and second static pressure bearings by way of the fluid passages 13, 14, and it is designed to develop a couple in the torque ring 4 around the rotation axial center m by the static pressure of the fluid let into the first static pressure bearing 2 and the static pressure of the fluid let into the second static pressure bearing 5.

In this construction, thus, with the axial center n of pintle 9 deviated from the rotation axial center m, when a high pressure fluid is supplied into the space 7 existing in the right region A in FIG. 3, through, for example, the first fluid passage 11, couple to rotate the torque ring 4 in the direction of the arrow S occurs in torque ring 4, and the function as a motor is exhibited. Or, when torque ring 4 is rotated in the direction of, for example, arrow R by an external force, the high pressure fluid is discharged from the first fluid passage (see arrow Q), so that the function as a pump is fulfilled.

Figure 4:
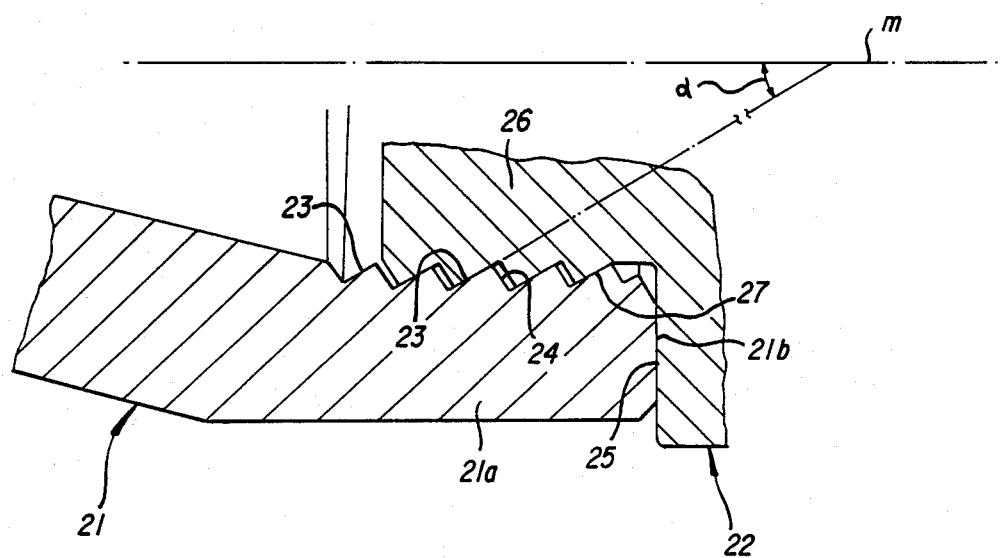

The casing 1 of the fluid energy converter of FIGS. 1 to 3 is composed of a casing main body 21, and a rear cover 22 fitted to the opening end of this casing main body. The casing main body 21 is shaped like a cup to accommodate torque ring 4, piston 6, and cylinder barrel 8, and its rear end is opened. A taper plane 23, FIG. 4, is formed in the inner circumference of the opening end 21a of this casing main body 1. This taper plane has an angle $\alpha$ of 45° or less with respect to the axial center m of casing main body 1, with a specified width, and is formed helically. That is, this taper plane 23 has a helical taper surface. A steep slope 24 of a specified width is formed between the top edge and bottom edge of the taper plane 23.

On the other hand, the rear cover 22 is shaped like a disc to support the cylinder barrel 8 by way of the pintle 9, and it has a trapezoidal groove 22a in which the base end part 9a of the pintle 9 is fitted slidably. The rear cover 22 has an annular stopping plane 25 for stopping the opening end 21b of the casing main body 21, and a circular bulging part 26 formed inside this stopping plane 25. On the outside of this circular bulging part 26, there is a spiral taper plane 27 having the same angle as said taper plane 23. This taper plane 27 has the same angle $\alpha$ width respect to the axial center m of the casing main body 21, with a specified width, and is formed helically in the same pitch as that of said taper plane 23.

In the taper plane 27 forming area of this rear cover 22, the taper plane 23 forming area of the casing 21 is tightened by threading to the position where the opening end 21 is fixed on the stopping plane 25.

In this construction, due to the reaction force the casing main body 21 receives from the stopping plane 25 of the rear cover 22, the helical taper plane 23 provided inside the casing main body 21 rides over the taper plane 27 of the rear cover 22 to contact tightly. As a result, the taper guide action is exhibited, and the casing main body 21 and rear cover are coupled in an accurately positioned state.

In this state, the gap in the radial direction between the casing main body 21 and rear cover 22 is completely eliminated. Still more, since these taper planes 23, 27 are slightly inclined at an angle of 45° or less with respect to the axial center, if a considerably large load in the radial direction is applied on the casing main body 21, the taper plane 23 of the casing main body 21 will hardly slide along the taper plane 27 of the rear cover 22. Accordingly, if a relative misaligning force in the radial direction should be applied between the casing main body 21 and rear cover 22, the both parts will not be dislocated from each other. That is, if having a steep helical plane at 45° or more with respect to the axial center, as in an ordinary thread, slipping of the parts along the helical plane may occur when a radial load is applied to cause dislocation easily, but when the taper planes 23, 27 are used, as in this invention, as far as the range of load is normal, using ordinary members, the relative positions of the casing main body 21 and rear cover 22 will be accurately maintained.

Figure 7:
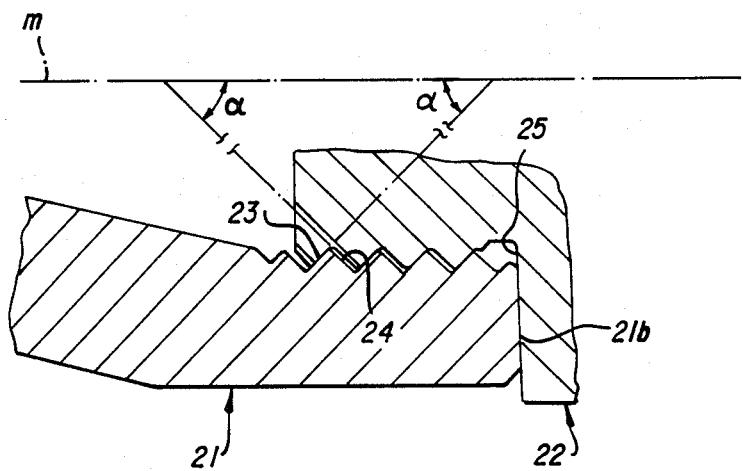
FIG. 7 is an enlarged sectional view, similar to FIG. 4, but sharing both tapered planes having the same angle.

In the practice of the instant invention, as best shown in FIG. 7, both taper planes 23 and 24 may have the same angle of 45° and the relative positions of the casing main body 21 and rear cover 22 will be accurately maintained.

Therefore, it is not necessary to form a spigot between the casing main body and rear cover to set the relative tolerance strictly as required in the prior art, and the machining may be facilitated and the difficulty of assembling will be solved spontaneously.

In addition, since the casing main body 21 can be positioned by abutting its opening end 21b against the stopping plane 25 of the rear cover 22, the repeatability of positioning in the axial direction will be also excellent.

Figure 5:
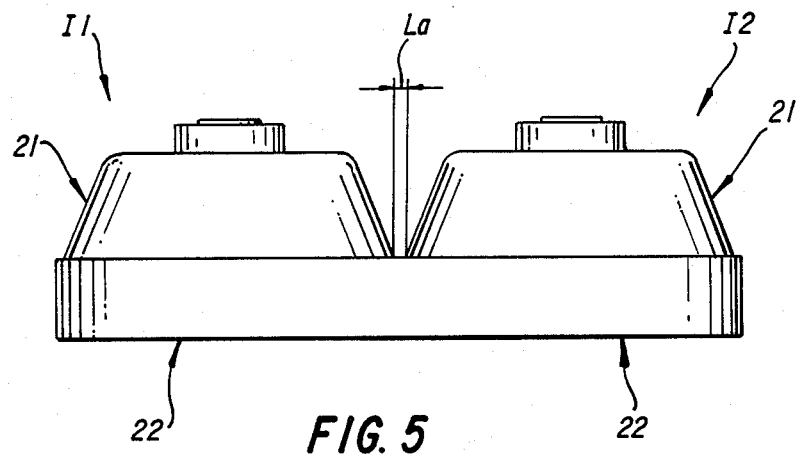
Figure 6:
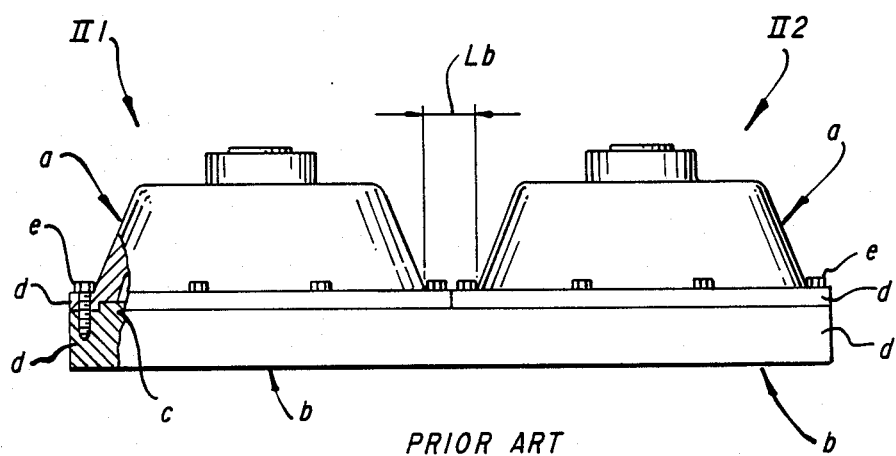
FIG. 6 is a side view, similar to FIG. 5, but sharing the assembly of the prior art.

In this composition, furthermore, when the both taper planes 23, 27 are tightened, the wedge actions are induced between the taper planes 23, 27 not only in the rotating direction but also in the axial direction, so that the coupling is hardly loosened. This construction, still more, since the flange coupling part is not needed, the maximum outside diameter of the casing 1 may be reduced, so that the entire equipment may be designed compactly. FIG. 5 and FIG. 6 are explanatory drawings showing the compactness afforded by the invention. That is, in FIG. 5, beside the fluid energy converter Il explained hereabove, another fluid energy converter I2 of the same constitution is disposed, and the rear covers 22, 22 of these two fluid energy converters 11, 12 are coupled together into one body. Moreover, the first and second fluid passages 11, 12 of one fluid energy converter Il, and the first and second fluid passages (not shown) of the other fluid energy converter I2 are connected with each other by way of first and second communicating routes 28, 29 formed at both sides of the rear cover 22, thereby composing a liquid pressure transmission of so-called HST type. Thus, in such mode of use, when the junction of the casing main bodies 21 and rear covers 22 of the fluid energy converters 11, 12 are achieved by threading of the helical taper planes 23, 27, the spacing distance La between the casing main bodies 21 of the fluid energy converters Il, I2 may be defined to an extremely small length. On the other hand, in the case of the prior art shown in FIG. 6, the casing main bodies a and rear covers b of the fluid energy converters Il1, Il2 are positioned by the spigots c, and by placing bolts e into the flange connection parts d provided outside, the casing main bodies a and rear covers b are joined, which means it is difficult to reduce the spacing distance Lb between the two casing main bodies a. In this invention, therefore, as compared with the conventional equipment, the outside diameter can be notably reduced, and the entire equipment may be reduced in size and weight.

In the embodiment of FIGS. 1-3 described herein, the taper plane is formed inside the opening end of the casing main body, which is not, however, limitative. For example, a spiral taper plane may be formed outside the casing main body, and a taper plane fitting with this taper plane may be formed inside the dent part provided in the rear cover. Such an embodiment of the invention is illustrated in FIGS. 8–10.

Figure 8:
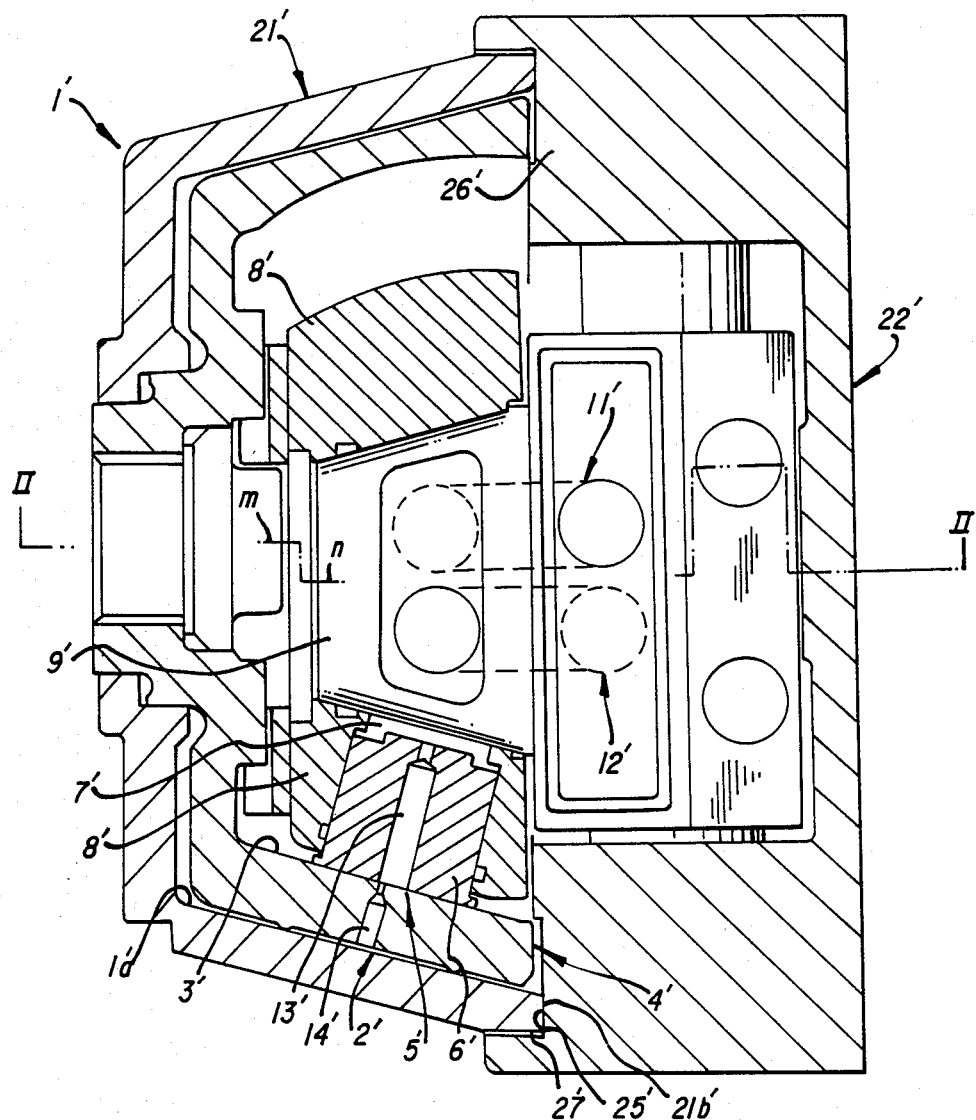
FIG. 8 is a longitudinal sectional view, similar to FIG. 1, but showing a second embodiment of the invention.
Figure 9:
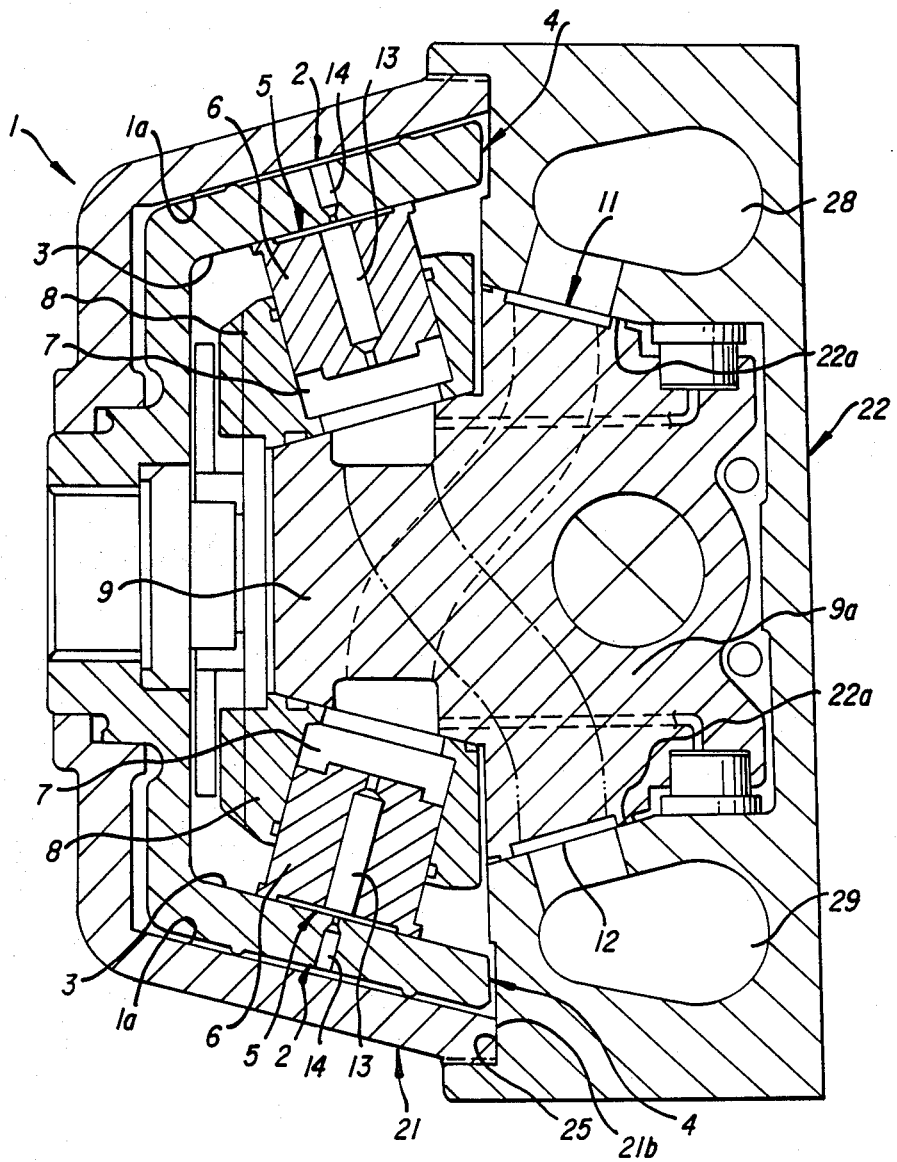
FIG. 9 is a section view taken at II—II, FIG. 8.

The fluid energy converter in the embodiment shown in FIGS. 8 and 9 is of the same structure as described with respect to FIGS. 1–3, above, and like reference numerals are used with respect thereto. Where the embodiments differ is that, in the embodiment of FIGS. 8 and 9, the taper plane is formed outside the opening end of the casing main body 1'. Thus, the taper plane 23', FIG. 10, is formed on the outer circumference of the opening end 21a' of main casing body 1' and is received in the inside circular recess 22a' of rear cover 22' and spiral taper plane 27' thereof having the same angle α with respect to the axial center m of the casing main body 21'. Thus, as in the embodiment of FIGS. 1–3, the angle α is 45° or less.

Figure 10:
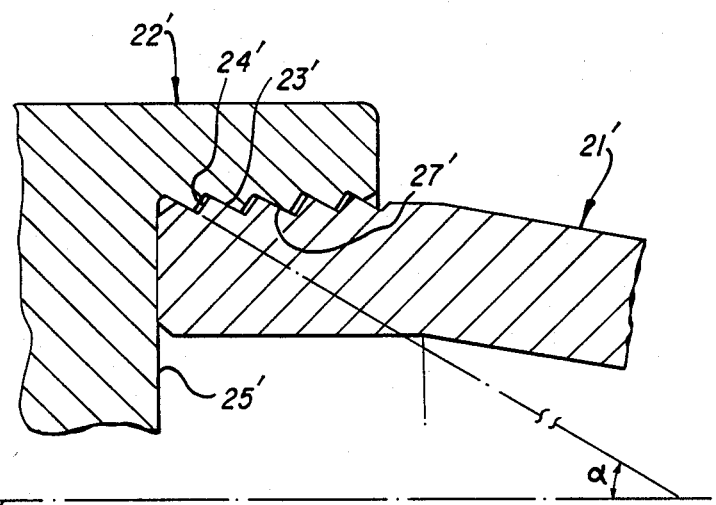
FIG. 10 is an enlarged sectional view of the threaded connection of FIGS. 8 and 9.

In the taper plane 27' forming area of rear cover 22', in the embodiment of FIGS. 8–10, the taper plane 23' forming area of the casing 21' is tightened of threading to the position where the opening end is fixed on the stopping plane 25', FIG. 10.

The internal structure of the fluid energy transducer is not limited to the above constructions, and may be also, for example, applied to an ordinary radial piston type pump/motor.

This invention, having such organization, is intended to position and joint the casing main body and cover accurately, without requirement of high precision in machining or difficulty in assembling work, and if a large misaligning force in the radial direction is applied between the casing main body and cover, its positioning will not be spoiled, so that it is possible to present an excellent fluid energy converter reduced in both size and weight by spontaneously reducing the maximum outside diameter of the entire assembly.

What is claimed:

1. A fluid energy converter having a casing body with an open end and a cover supporting a cylindrical barrel holding a plurality of pistons positioned in and mounted on said open end of said casing body, said open end of said casing body having a tapered plane at an angle not more than 45° with respect to the axial centerline of said casing body formed helically of the opening end of said casing body open end, said tapered plane extending circularly around and equidistantly from said casing main body centerline, said cover having a helical tapered plane at the same angle as said tapered plane and extending circularly around and equidistant from the axial center line of the cover and stopping planes at said open end of said casing body and on said cover, said tapered plane on said cover being engagable with said tapered plane on said casing body for threading said cover onto said open end of said casing body until said stopping planes engage to close said open end of said casing body and secure said cover on said body.

2. A fluid converter, as recited in claim 1, in which said tapered plane is formed on said casing body on the inner circumference of said body at said open end and said tapered plane on said cover is formed on an outer periphery of said cover.

3. A fluid converter, as recited in claim 1, in which said tapered plane is formed on said casing body on the outer circumference of said body at said open end and said tapered plane on said cover is formed on an inner periphery of said cover.

* * * * *

UNITED STATES PATENT AND TRADEMARK OFFICE
CERTIFICATE OF CORRECTION

PATENT NO.  : 4,867,042
DATED       : September 19, 1989
INVENTOR(S) : Yasuo KITA It is certified that error appears in the above-identified patent and that said Letters Patent is hereby corrected as shown below:

On the cover page, after Item [22] the following should be added:

--[30]      Foreign Application Priority Data
      July 7, 1986 [JP].........................61-104403--.

Signed and Sealed this

Thirteenth Day of November, 1990

Attest:

HARRY F. MANBECK, JR.

*Attesting Officer*      Commissioner of Patents and Trademarks